United States Patent

Brack et al.

[11] 4,017,484
[45] Apr. 12, 1977

[54] CATIONIC DYESTUFFS

[75] Inventors: Alfred Brack; Hubertus Psaar, both of Leverkusen, Germany

[73] Assignee: Bayer Aktiengesellschaft, Leverkusen, Germany

[22] Filed: Oct. 23, 1975

[21] Appl. No.: 625,181

Related U.S. Application Data

[63] Continuation of Ser. No. 469,521, May 13, 1974, abandoned, which is a continuation of Ser. No. 271,723, July 14, 1972, abandoned.

[30] Foreign Application Priority Data

July 14, 1971 Germany .......................... 2135156

[52] U.S. Cl. ...................... 260/240 R; 260/240 G; 260/240.1; 260/240.6; 260/240.65; 260/240.8; 260/244 R; 260/283 R; 260/315; 260/319.1

[51] Int. Cl.² ...................................... C07D 401/06

[58] Field of Search ....... 260/240.6, 240.65, 240 R, 260/240.1, 240 G, 240.8, 319.1, 315, 244 R, 283 R

[56] References Cited

UNITED STATES PATENTS

| | | | |
|---|---|---|---|
| 2,304,981 | 12/1942 | Wilmanns | 260/240.6 |
| 2,979,512 | 4/1961 | Wright | 260/240 R |
| 3,094,418 | 6/1963 | Heseltine et al. | 260/240 R |
| 3,832,171 | 8/1974 | Janssens et al. | 260/240.6 |

Primary Examiner—Arthur P. Demers
Attorney, Agent, or Firm—Plumley and Tyner

[57] ABSTRACT

Cationic dyestuffs of the formula

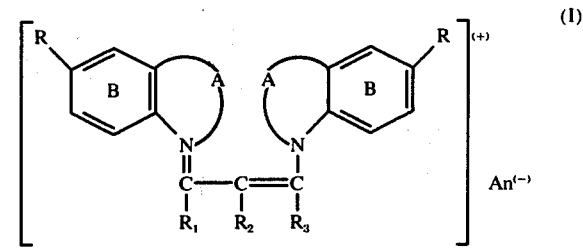

wherein R denotes an alkoxy, aralkoxy, aryloxy or acylamino radical, $R_1$ and $R_3$ denote hydrogen or an alkyl, cycloalkyl, aralkyl or aryl radical, $R_2$ denotes hydrogen, halogen or an alkyl, cycloalkyl, aralkyl, aryl, nitrile, carboxylic acid ester, arylazo or heterocyclic radical, A denotes members of ring an $An^{(-)}$ denotes an anion, are suitable for dyeing and printing of natural and synthetic materials, especially of the polymers of acrylnitrile.

6 Claims, No Drawings

CATIONIC DYESTUFFS

This is a continuation of application Ser. No. 469,521, filed May 13, 1974, now abandoned, which is a continuation of Ser. No. 271,723 filed July 14, 1972, now abandoned.

The present invention relates to new cationic dyestuffs of the general formula

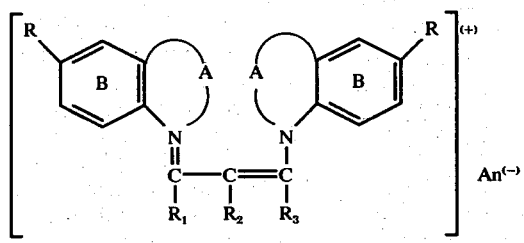

(I)

wherein
R denotes an alkoxy, aralkoxy, aryloxy or acylamino radical,
$R_1$ denotes hydrogen or an alkyl, cycloalkyl, aralkyl or aryl radical,
$R_2$ denotes hydrogen, halogen or an alkyl, cycloalkyl, aralkyl, aryl, nitrile, carboxylic acid ester, arylazo or heterocyclic radical,
$R_3$ denotes hydrogen or an alkyl, cycloalkyl, aralkyl or aryl radical,
A denotes the remaining members of a ring which is saturated with the exception of the bond which it shares with the fused ring B, and
$An^{(-)}$ denotes an anion, and
the rings and the acyclic radical can contain non-ionic substituents and/or carboxyl groups.

Preferred dyestuffs are those of the general formula

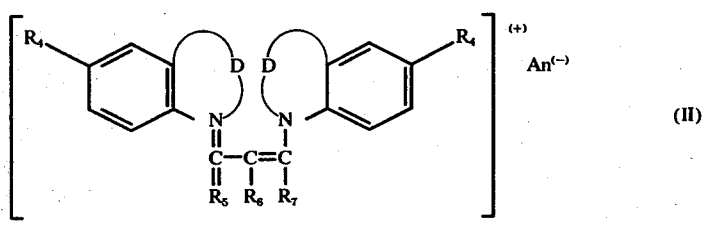

(II)

wherein
$R_4$ denotes an alkoxy group with 1 to 4 C atoms,
$R_5$ denotes hydrogen or an alkyl or aryl group,
$R_6$ denotes hydrogen, fluorine, chlorine, bromine or an alkyl, aryl, arylazo or nitrile group,
D denotes the remaining members of an indoline, 1,2,3,4-tetrahydroquinoline or -quinoxaline ring and
$An^{(-)}$ denotes an anion, and
the rings and the acyclic radicals can contain non-ionic substituents.

Particularly preferred dyestuffs are those of the general formulae (III) to (VI)

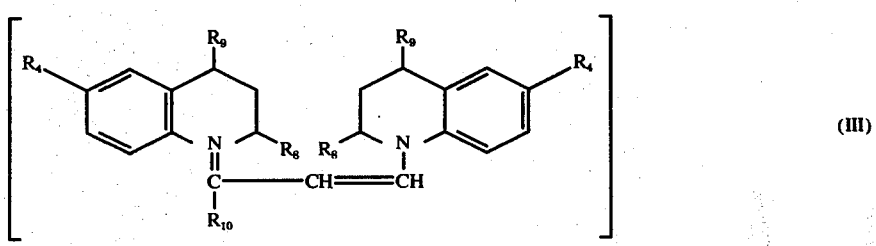

(III)

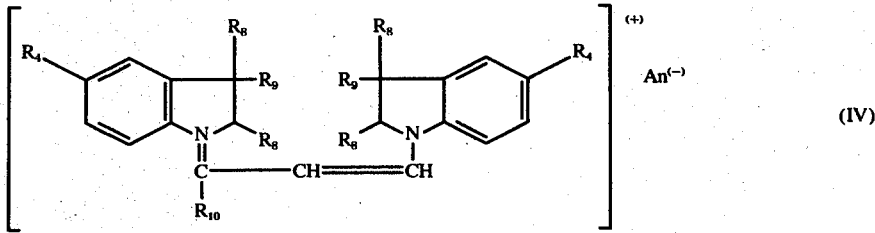

(IV)

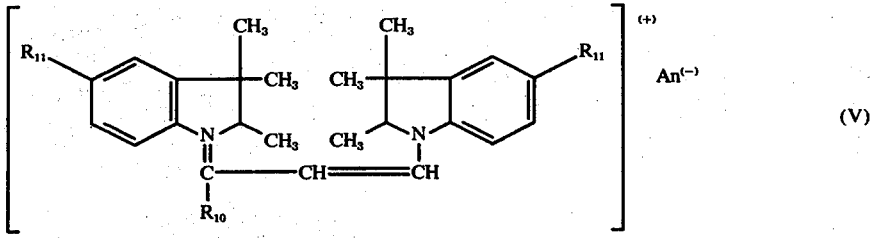

(V)

-continued

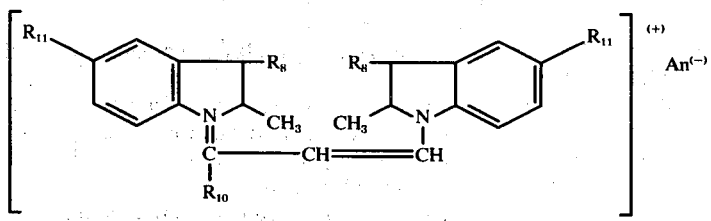

(VI)

wherein
R₄ denotes an alkoxy group with 1 to 4 C atoms,
R₈ denotes hydrogen or a methyl group,
R₉ denotes hydrogen or a methyl group,
R₁₀ denotes hydrogen, a phenyl radical or a phenyl radical substituted by non-ionic radicals,
R₁₁ denotes a methoxy or ethoxy group and
An$^{(-)}$ denotes an anion.

The dyestuffs of the formulae (I) to (VI) in which R₁, R₂, R₃ or R₅, R₆, R₇ or R₁₀ represent hydrogen, are preferred for economic reasons.

Processes for the manufacture of these dyestuffs, and their use for dyeing and printing natural and synthetic materials, as well as materials dyed and printed with these dyestuffs, are also a subject of the invention.

According to the definition, non-ionic substituents can be present in the dyestuffs and compounds according to the invention. Examples of suitable substituents are: fluorine, chlorine and bromine; alkyl groups, especially straight-chain or branched lower alkyl radicals with 1 – 6 C atoms; aralkyl radicals; alkenyl radicals; aryl radicals; alkoxy radicals, especially lower alkoxy radicals with 1 – 4 C atoms; aralkoxy radicals; aryloxy radicals, especially those wherein aryl represents a radical of the benzene series; alkylthio radicals, preferably lower alkylthio radicals with 1 – 3 C atoms; aralkylthio radicals; arylthio radicals, preferably phenylthio and its derivatives which are substituted in the phenyl nucleus; nitro; nitrile; alkoxy-carbonyl, preferably those with a lower alkoxy radical with 1 – 4 C atoms; the formyl radical; alkylcarbonyl radicals, especially those with a lower alkyl group with 1 – 4 C atoms; arylcarbonyl, especially those wherein aryl represents a radical of the benzene series; aralkylcarbonyl, preferably with arylalkyl radicals whereof the aryl nucleus belongs to the benzene series; alkoxycarbonyloxy radicals, preferably with lower alkoxy radicals; acylamino radicals, such as alkyl-carbonylamino radicals, preferably with a lower alkyl group with 1 – 4 C atoms, arylcarbonylamino radicals, preferably those whereof the aryl radical belongs to the benzene series; alkylsulphonylamino radicals, preferably with a lower alkyl group with 1 – 3 C atoms; arylsulphonylamino groups, preferably those in which the aryl radical belongs to the benzene series; ureido, N-aryl-ureido or N-alkyl-ureido, aryloxycarbonylamido and alkyloxycarbonylamido; carbamoyl (carbonamide); N-alkyl-carbamoyl; N,N-dialkyl-carbamoyl; N-alkyl-N-aryl-carbamoyl; sulphamoyl; N-alkyl-sulphamoyl; N,N-dialkyl-sulphamoyl; alkylsulphonyl; aralkyl-sulphonyl, with 1 – 4 C atoms preferably being present in the alkyl radicals mentioned; arylsulphonyl, especially those wherein aryl represents a radical of the benzene series, carboxylic acid alkyl ester, carboxylic acid aryl ester, sulphonic acid alkyl ester and sulphonic acid aryl ester groups.

By an alkyl radical, there is understood a saturated or olefinically unsaturated aliphatic radical with 1 to 6 C atoms which can contain non-ionic substituents and/or carboxyl groups, for example the methyl, ethyl, n- and iso-propyl, n-, iso- and tert.-butyl and the various isomeric pentyl and hexyl radicals, as well as vinyl, allyl or propenyl radicals.

Possible anionic radicals An⁻ are the organic and inorganic anions which are customary for cationic dyestuffs.

Inorganic anions are, for example, fluoride, chloride, bromide and iodide, perchlorate, hydroxyl, radicals of S-containing acids, such as hydrogen sulphate, sulphate, di-sulphate and aminosulphate; radicals of nitrogen-oxygen acids, such as nitrate; radicals of oxygen-acids of phosphorus, such as dihydrogen-phosphate, hydrogen-phosphate, phosphates and metaphosphate; radicals of carbonic acid such as bicarbonate and carbonate; further anions of oxygen-acids and complex acids, such as methosulpahte ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of the methyl-phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, O-ethylglycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(isotridecyloxy)-diethyleneglycol-ether-propionic acid, the ether-propionic acid of an alcohol mixture with 6 to 10 carbon atoms, thioacetic acid, 6-benzoylamino-2-chlorocaproic acid, nonylphenoltetraethyleneglycol-ether-propionic acid, nonylphenol-diethyleneglycol-ether-propionic acid, dodecyltetraethyleneglycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 of SHELL), a mixture of aliphatic carboxylic acids with 15 to 19 carbon atoms (Versatic Acid 1519 of SHELL), coconut fatty acid first runnings, undecanecarboxylic acid, n- tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl-ether-α,α'-dicarboxylic acid, methylene-bis-thioglycollic acid, dimethyl-sulphide-α,α-dicarboxylic acid, 2,2'-dithio-di-n-propionic acid, fumaric acid, maleic acid, itaconic acid, ethylene-bis-iminoacetic acid, nitrolosulphonic acid, methanesulphonic acid, ethanesulphonic acid, chloromethanesulphonic acid, 2-chloroethanesulphonic acid and 2-hydroxyethanesulphonic acid and Mersolate, that is to say $C_8$–$C_{15}$ paraffinsulphonic acid obtained by chlorosulphonation of paraffin oil.

Suitable anions of cycloaliphatic carboxylic acids are, for example, the anions of cyclohexanecarboxylic acid and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butyl-benzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methyl-benzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, ovanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Suitable anions of heterocyclic carboxylic acids are, for example, the anions of pyromucic acid, dehydromucic acid and indolyl-(3)-acetic acid.

Suitable anions of aromatic sulphonic acids are, for example, the anions of benzenesulphonic acid, benzene-1,3-disulphonic acid, 4-chlorobenzenesulphonic acid, 3-nitro-benzenesulphonic acid, 6-chloro-3-nitro-benzenesulphonic acid, toluene-4-sulphonic acid, toluene-2-sulphonic acid, toluene-ω-sulphonic acid, 2-chlorotoluene-4-sulphonic acid, 1-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4-disulphonic acid, or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

A suitable anion of heterocyclic sulphonic acids is, for example, the anion of quinoline-5-sulphonic acid.

Further possibilities are the anions of arylsulphinic, arylphosphonic and arylphosphonous acids, such as benzene-sulphinic and benzenephosphonic acid.

Colourless anions are preferred. For dyeing from an aqueous medium, those anions which do not excessively impair the solubility of the dyestuff in water are preferred. For dyeing from organic solvents, those anions which promote the solubility of the dyestuff in organic solvents or at least do not affect it adversely are frequently also preferred.

The anions present from the manufacturing process can be replaced by other anions in a known manner.

The new dyestuffs are manufactured by condensation of a cyclic amine of the formula

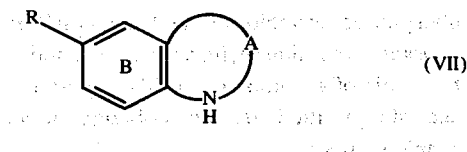

wherein
the radicals A and R and the ring D have the abovementioned meaning,
with a carbonyl compound of the general formula

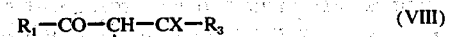

wherein
the radicals $R_1$, $R_2$ and $R_3$ have the meaning mentioned in the formula I and
the grouping —CX— represents a carbonyl group or a functionally similar group such as an acetal, aminal, mercaptal or nitrone group,
or with a carbonyl compound of the general formula

wherein
the radicals $R_1$, $R_2$ and $R_3$ have the abovementioned meaning and
$X_1$ represents a removable radical such as halogen, hydroxyl, alkoxy or alkylcarbonyloxy,
in an acid which yields an anion $An^{(-)}$ or in an organic solvent in the presence of a condensation agent which yields an anion $An^{(-)}$.

The condensation is appropriately carried out by warming the components to 50°–150° C, preferably 80°–120° C, either in an organic acid and/or in an inorganic acid such as formic, acetic, propionic, chloroacetic, dichloroacetic and trichloroacetic acid, hydrochloric acid, hydrobromic acid, sulphuric acid, phosphoric acid and polyphosphoric acid, optionally with the addition of agents which split off water, such as acetic anhydride or zinc chloride, or in an organic solvent; for example methylene chloride, chloroform, carbon tetrachloride, dichloroethane and tetrachloroethane, chlorobenzene and dichlorobenzene, acetonitrile and carbon disulphide, in the presence of a condensation agent, for example an organic or inorganic acid halide, such as phosphorus oxychloride, phosphorus trichloride, thionyl chloride and phosgene.

A variant of the process consists of producing a dicarbonyl compound, or its derivatives VIII and IX, in situ from a suitable starting product and immediately to carry out the further reaction with a compound (VII). Starting products for this particularly economical process are above all methylketones, especially acetophenone and its nuclear substitution products. It is known that such methylketones are formylated under the conditions of the Vilsmeier aldehyde synthesis. Thus, for example, β-chloro-cinnamaldehyde is produced from acetophenone. If such a methylketone is first treated, under conditions known from the literature, with a so-called Vilsmeier reagent — for example a mixture of phosphorus oxychloride and dimethylformamide or phosgene and dimethylformamide — and then at least two mols of a compound (VII) are added, a dyestuff according to the invention is obtained in a particularly simple manner.

Further suitable starting products for the intermediate production of carbonyl compounds VIII and IX or their functional derivatives are mucochloric acid and mucobromic acid, which on warming with the compounds (VII) in inert solvents react, with elimination of $CO_2$, like α,β-dichloroacrolein, and the same dyestuff as from the corresponding meso-halogeno-malondialdehyde is produced.

Suitable cyclic amines of the formula (VII) are, for example, 6-methoxy-, 6-ethoxy-, 6-n-propoxy-, 6-n-butoxy-, 6-iso-butoxy-, 6-benzyloxy-, 6-β-phenylethoxy-, 6-β-cyanoethoxy-, 6-β-chloroethoxy-, 6-β-methoxyethoxy-, 6-phenoxy-, 6-acetamino-, 6-propionylamino-, 6-methoxycarbonylamino-, 6-β,β-dimethylamidocarbonyl-amino- and 6-methylsulphonylamino-tetrahydroquinoline, 2- and 4-methyl-6-methoxy-tetrahydroquinoline, 2-methyl-4-phenyl-6-methoxy-tetrahydroquinoline, 6,8-dimethoxy-tetrahydroquinoline, 6-ethoxy- and 6-acetamino-8-methoxy-tetrahydroquinoline, 6-methoxy-tetrahydro-1,4-benzoxazine, 6-methoxy-tetrahydroquinoxaline, 5-methoxy-indoline, 5-methoxy- and 5-ethoxy-2-methyl-indoline, 5-acetylamino-, 5-propionylamino-, 5-ethoxycarbonylamino- and 5-ureido-2-methyl-indoline, 5-methoxy-2-phenyl-indoline, 5,7-dimethoxy-2-methyl-indoline, 2,3-dimethyl-5-methoxy-indoline, 2,3,3-trimethyl-5-methoxy-, -5-ethoxy-, 5-n-butoxy-, 5-β-methoxyethoxy-, 5-β-cyanoethoxy- and 5-acetamino-indoline, 6-methoxy-, 6-ethoxy- and 6-acetamino-1,1a, 2,3,4,4a-hexahydrocarbazole.

Suitable carbonyl compounds VIII and IX are, for example, malondialdehyde, 1,1,3,3-tetramethoxy- or -ethoxy-propane, 1,3,3-trimethoxy- or -ethoxy-prop-1-ene, meso-substituted malondialdehyde (derivatives) such as 2-chloro-, 2-fluoro-, 2-bromo-, 2-phenyl-, 2-phenylazo-, 2-α-pyridyl-, 2-benzthiazolyl-(2')-, 2-benzoxazolyl-(2')- and 2-(3',3'-dimethyl-indolenyl-2')-malondialdehyde (formula XI) or their enamines with dimethylamine or methylaniline, for example XII and XIII

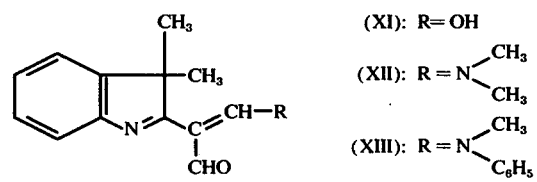

acetylacetone, acetylacetaldehyde and its acetals such as the dimethylacetal and diethylacetal, benzoylacetaldehyde or β-chlorocinnamaldehyde, 4'-chloro-, 4'-methoxy-, 4'-methyl-, 4'-nitro- and 4'-ethoxycarbonylamino-β-chloro-cinnamaldehyde.

The new dyestuffs are suitable for dyeing, printing and bulk dyeing of materials which consist of polyacrylonitrile or of copolymers or acrylonitrile, containing at least 85% of acrylonitrile, with other vinyl compounds, such as vinyl chloride, vinylidene chloride, vinyl fluoride, vinyl acetate, vinylpyridine, vinylimidazole, vinyl alcohol, acrylic and methacrylic acid esters and amides are asymmetrical dicyanoethylene, or of acid-modified polyesters or acid-modified polyamides. They are furthermore suitable for the other known end uses of the so-called "basic dyestuffs", for example dyeing and printing acetate rayon, silk, coir, sisal, jute, paper and tannin-treated cotton, for the manufacture of inks and ball pen pastes, and for use in flexographic printing.

The dyeings and prints on the first-mentioned materials are distinguished by excellent fastness to light; the level of the other fastness properties — to wet processing, decatising, sublimation, rubbing, flue gas and perspiration — is also very high. The dyestuffs are extremely strongly coloured and hence permit the production of full dyeings and prints without worsening the properties of the material. Mixed with other dyestuffs, especially with blue dyestuffs, the new dyestuffs do not cause a worsening of the fastness to light.

The temperatures quoted in the description and in the examples are degrees centigrade, and the parts are parts by weight.

EXAMPLE 1

163 parts of 6-methoxy-tetrahydroquinoline and 82 parts of 1,1,3,3-tetramethoxy-propane are warmed with 1,000 parts of glacial acetic acid and 100 parts of concentrated hydrochloric acid to about 90° for 3–4 hours; methyl alcohol thereby produced is distilled off. The mixture which has cooled is poured into about 10,000 parts of water. The separating out of the dyestuff is completed by adding sodium chloride. The dyestuff of the formula

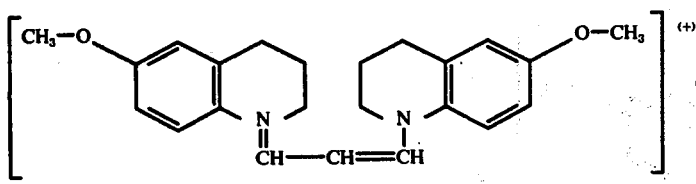

is obtained, which dyes polyacrylonitrile and acid-modified polyamide in a yellow of excellent fastness to light.

If instead of 6-methoxy-tetrahydroquinoline one of the following tetrahydroquinoline derivatives is used, in each case in equivalent amounts, and the procedure is in other respects unchanged, very fast yellow dyestuffs are again obtained:

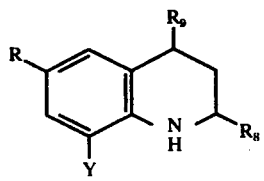

| R | Y | $R_8$ | $R_9$ |
|---|---|---|---|
| Ethoxy | Hydrogen | Hydrogen | Hydrogen |
| iso-Propoxy | " | " | " |
| n-Butoxy | " | " | " |
| β-Cyanoethoxy | " | " | " |
| β-Chloroethoxy | " | " | " |
| β-Methoxyethoxy | " | " | " |
| Methoxy | Methoxy | " | " |
| Ethoxy | Ethoxy | " | " |
| Methoxy | Methyl | " | " |
| Methoxy | Ethyl | " | " |
| Acetylamino | Hydrogen | " | " |
| β,β-Dimethylamido-carbonylamino | " | " | " |
| Ethoxycarbonylamino | " | " | " |
| Methoxy | " | Methyl | " |
| Methoxy | " | Hydrogen | Methyl |
| Methoxy | " | Methyl | Methyl |
| Methoxy | " | Methyl | Phenyl |

EXAMPLE 2

A mixture of 15.5 parts of 4-chloro-acetophenone with 10 parts of dimethylformamide is treated with 17 parts of phosphorus oxychloride at 60°–70°. The mixture is kept at approx. 70° for 4 hours. Thereafter 33 parts of 2-methyl-5-methoxy-indoline are added dropwise at 70°–80°; as soon as necessary, the mixture is diluted with 5 to 10 parts of dimethylformamide. The whole is stirred for a further 1½ hours at 80°, the mixture is then cooled to below 50° and poured into 500 parts of water, and 25 parts of sodium chloride are added. The crude dyestuff which initially is mostly obtained in a resinous form is recrystallised from water with the addition of active charcoal, or is converted, for purification, into the zinc chloride double salt, which crystallises well. The dyestuff corresponds to the formula

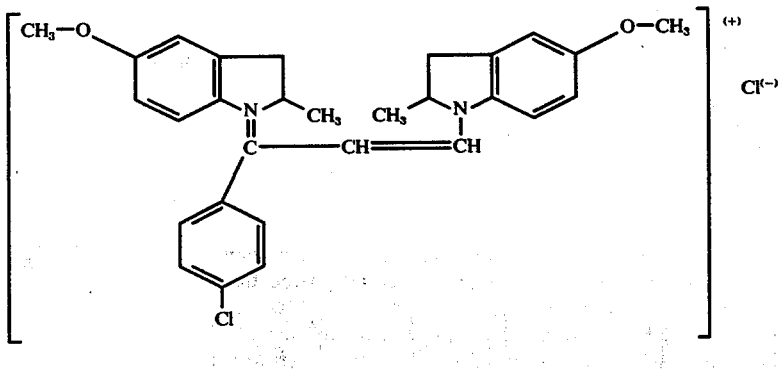

and gives reddish-tinged yellow dyeings and prints of very good fastness to light on polyacrylonitrile and acid-modified polyamides.

Instead of 4-chloro-acetophenone, the particular equivalent amount of 4-methyl-, 4-iso-propyl-, 4-methoxy-, 4-nitro-, 3-methyl- and 3,4-dimethoxy-acetophenone can also be used; tinctorially very similar dyestuffs of corresponding structure are then obtained.

EXAMPLE 3

215 parts of the compound of the formula

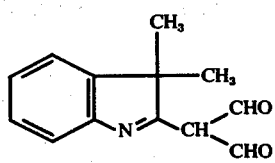

and 382 parts of 2,3,3-trimethyl-5-methoxy-indoline are warmed with 4,000 parts of glacial acetic acid to about 105° for 2 hours. After cooling, the mixture is diluted with an approximately five-fold volume of water. The dyestuff which separates out, corresponds to the formula

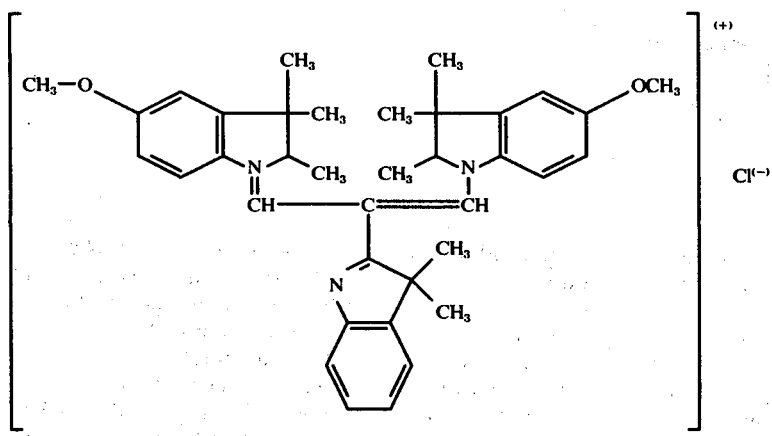

and dyes polyacrylonitrile and acid-modified polyamides in a yellow having very good fastness properties.

The dialdehyde used is manufactured as follows: 350 g of phosphorus oxychloride are added dropwise to 175 g of dimethylformamide at 50°–60°. After stirring for about 2 hours at 60°–70°, 159 g of 2,3,3-trimethylindolenine are added dropwise at 60°–75°. The mixture is stirred for 5 hours at about 80° and after cooling is poured into 400 ml of $H_2O$. In the course thereof, the temperature should not rise above 40°. The mixture thus obtained is brought to a volume of 4 l by slow dropwise addition of water whilst stirring and is then adjusted to pH = 6 to 7 by means of concentrated sodium hydroxide solution at room temperature, and after stirring for several hours the product is filtered off. 196.1 g of crude dialdehyde melting at 123°–127° are obtained. After recrystallisation from alcohol, the melting point was 130° C.

The following dialdehydes were manufactured analogously:

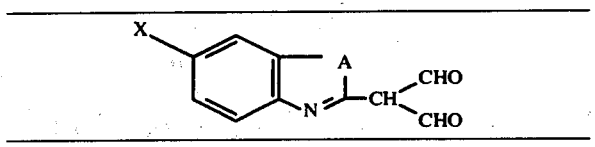

| | | |
|---|---|---|
| A = —C(CH_3)(CH_3), | X = OCH_3 | : M.p. = 147–150° (from alcohol) |
| A = " | X = OC_2H_5 | : M.p. = 160–163° (from alcohol) |

-continued

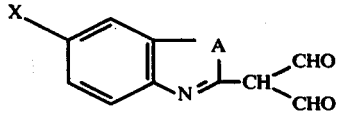

| | | |
|---|---|---|
| A = " | X = Cl | : M.p. = 140° (from methylcyclohexane) |
| A = O, | X = H | : M.p. = 210–216° (from alcohol + dimethylformamide) |
| A = S, | X = H | : M.p. = 226–230° (from acetonitrile) |

Using the same procedure, yellow very fast dyestuffs are obtained from these dialdehydes also.

EXAMPLE 4

216 parts of the compound of the formula

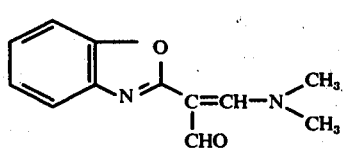

are condensed with 410 parts of 2,3,3-trimethyl-5-ethoxy-indoline in accordance with the instructions of Example 3. The dyestuff of the formula

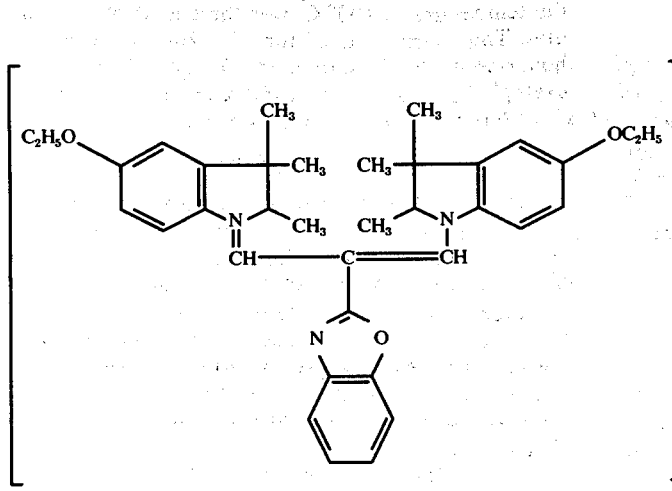

is obtained, which dyes polyacrylonitrile and acid-modified polyamides in a yellow having very good fastness properties.

The enamine-aldehyde can be manufactured as follows: 1 mol of 2-methylbenzoxazole is introduced dropwise, at 61°–75° into a Vilsmeier mixture prepared in accordance with the instructions in Example 3. After about 90 minutes, a thick, golden yellow suspension has been produced. The reaction is interrupted at this point in time, the suspension is poured into water, the mixture is rendered alkaline with concentrated sodium hydroxide solution, whilst cooling, and the enamine-aldehyde is isolated by extraction with chloroform, whilst cooling well. The crude aldehyde which is left after distilling off the chloroform is purified by recrystallisation from cyclohexane/benzene (3:1). It forms pale yellowish crystals which melt at 115°–118°.

EXAMPLE 5

169 parts of mucochloric acid in 750 parts of alcohol are heated to the boil with 330 parts of 2-methyl-5-methoxy-indoline for 4–5 hours. In the course thereof, carbon dioxide is split off. The alcohol is subsequently distilled off without exceeding a bath temperature of 90°. The crude product which remains is extracted by boiling with 3,000 parts of water. The dyestuff of the formula

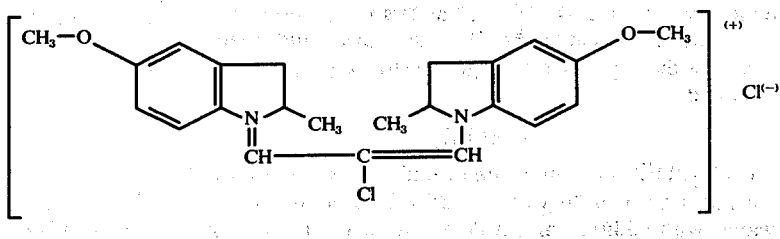

crystallises out from the filtrate; it dyes polyacrylonitrile and acid-modified polyamides in a luminous yellow having very good fastness properties.

On using the equivalent amount of mucobromic acid, the bromine-containing dyestuff of analogous structure, which is also very fast, is obtained.

EXAMPLE 6

124 parts of the compound of the formula

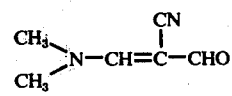

(manufactured according to Reichardt and Kermer, Synthesis 1970, 538) are condensed with 470 parts of 2,3,3-trimethyl-5-n-butoxy-indoline in accordance with the instructions of Example 3. The dyestuff of the formula

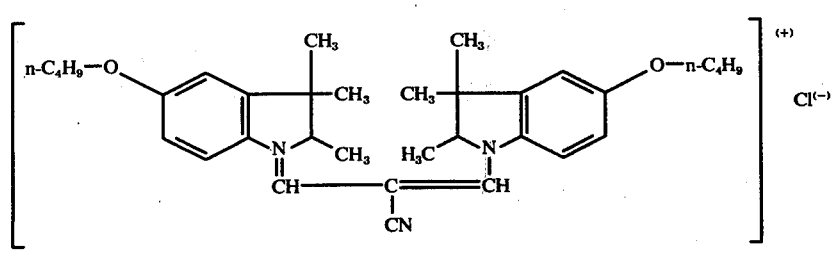

is obtained, which dyes polyacrylonitrile, acid-modified polyamides and acid-modified polyesters in a greenish-tinged yellow having very good fastness properties.

EXAMPLE 7

An aqueous dyebath containing, per liter, 0.75 g of 30% strength acetic acid, 0.40 g of sodium acetate and 0.25 g of the dyestuff of Example 1 (1st. formula) is charged, at approx. 45° C, with the amount of polyacrylonitrile fibres corresponding to a liquor ratio of 1 : 40, heated to the boil over the course of 20 – 30 minutes and kept at this temperature for 30 – 60 minutes. After rinsing and drying the fibres, a yellow dyeing of excellent fastness to light is obtained.

EXAMPLE 8

Acid-modified polyglycol terephthalate fibres of the DACRON 64 type (DuPont), or as described in Belgian Patent Specification 549,179 and U.S. Pat. No. 2,893,816, are introduced, using a liquor ratio of 1 : 40, into an aqueous bath at 20° which contains, per liter, 3 g of sodium sulphate, 0.5 – 2 g of an oleyl-polyglycol-ether (50 mols of ethylene oxide), 2.5 – 5 g of diphenyl and 0.3 g of the dyestuff of the formula of Example 1, and which has been adjusted to a pH-value of 4.5 – 5.5. with acetic acid. The bath is heated to 98° over the course of 30 minutes and kept at this temperature for 60 minutes. Thereafter the fibres are rinsed and dried. A yellow dyeing having very good fastness properties is obtained.

EXAMPLE 9

0.75 g of the dyestuff of the formula of Example 1 are worked into a paste with the 20-fold amount of hot water, with addition of a little acetic acid, in a dyeing beaker of 500 ml capacity located in a heated waterbath, and the paste is dissolved with hot water. Further, 0.5 g of the reaction product of 50 mols of ethylene oxide with 1 mol of oleyl alcohol is added to the dyeing liquor, which is made up to 500 ml with cold water. The pH-value of the dyeing liquor is adjusted to 4.5 – 5 with acetic acid or sodium acetate.

10 g of piece goods of acid-modified polyamide are constantly agitated in this dyeing liquor whilst raising the temperature to 100° C over the course of 15 minutes. The material is dyed for 15 – 20 minutes at the boil, rinsed with cold water and subsequently dried, for example by ironing or in a drying cabinet at 60°–70° C. A material dyed in a fast yellow is obtained.

EXAMPLE 10

A polyacrylonitrile fabric is printed with a printing paste of the following composition: 30 parts of the dye-stuff of the formula of Example 1, 50 parts of thiodiethylene glycol, 30 parts of cyclohexanol, 30 parts of 30% strength acetic acid, 500 parts of dextrin, 30 parts of aqueous zinc nitrate solution ($d = 1.5$) and 330 parts of water. The resulting print is dried, steamed for 30 minutes and subsequently rinsed. A yellow print having very good fastness properties is obtained.

We claim:

1. Cationic dyestuff having the formula

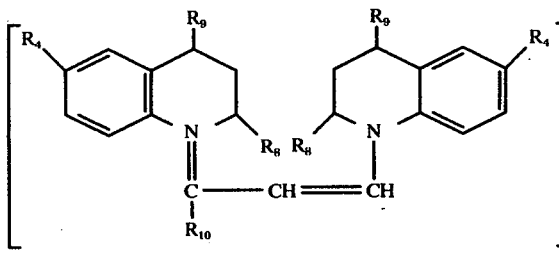

wherein
$R_4$ denotes an alkoxy group with 1 to 4 C atoms;
$R_8$ denotes hydrogen or a methyl group;
$R_9$ denotes hydrogen or a methyl group;
$R_{10}$ denotes hydrogen, a phenyl radical or a phenyl radical substituted by chloro, methyl, methoxy nitro or ethoxycarbonylamino; and
$An^-$ denotes an anion.

2. A cationic dyestuff of claim 1 having the formula

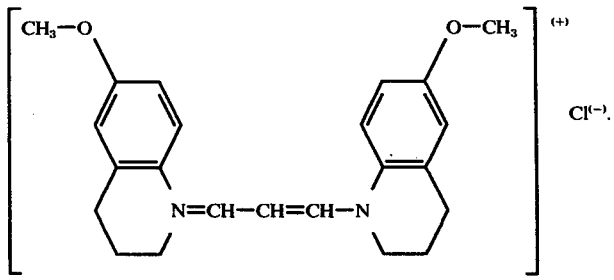

3. A cationic dyestuff of claim 1 having the formula

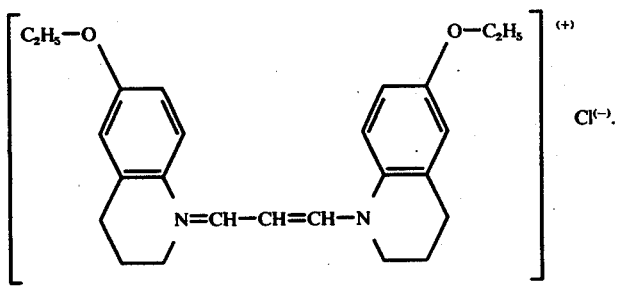
4. A cationic dyestuff having the formula
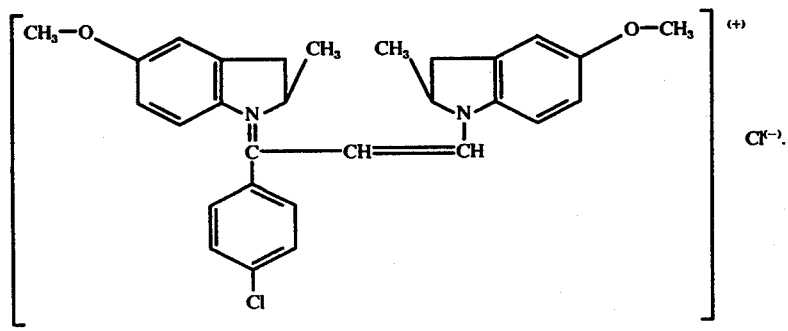
5. A cationic dyestuff having the formula
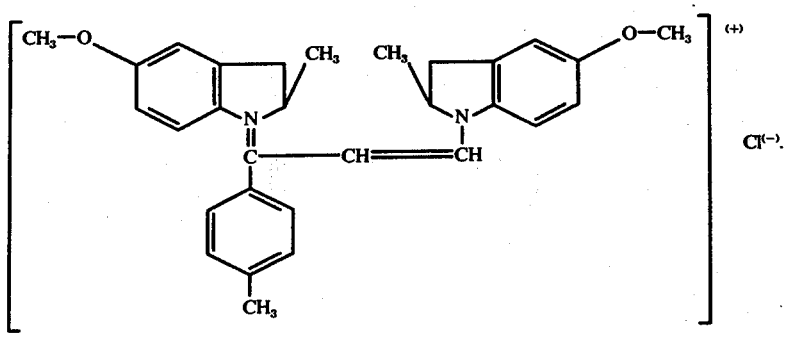
6. A cationic dyestuff having the formula
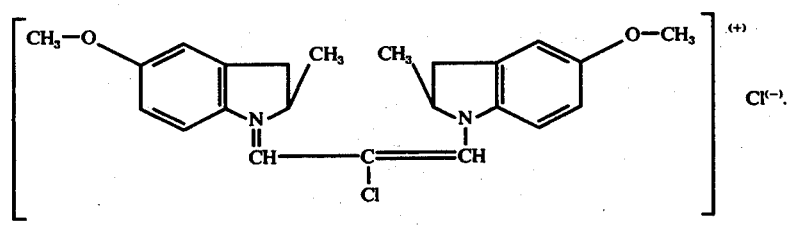
* * * * *